(12) United States Patent
Broadbent et al.

(10) Patent No.: US 12,459,591 B2
(45) Date of Patent: Nov. 4, 2025

(54) FRAME MOUNTED BICYCLE ACCESSORY

(71) Applicant: TAILFIN LIMITED, Bristol (GB)

(72) Inventors: Nicholas Broadbent, North Somerset (GB); Robert Phillips, Bristol (GB)

(73) Assignee: TAILFIN LIMITED, Bristol (GB)

( * ) Notice: Subject to any disclaimer, the term of this patent is extended or adjusted under 35 U.S.C. 154(b) by 336 days.

(21) Appl. No.: 18/173,885

(22) Filed: Feb. 24, 2023

(65) Prior Publication Data

US 2023/0264774 A1 Aug. 24, 2023

(30) Foreign Application Priority Data

Feb. 24, 2022 (GB) ........................................ 2202565
Apr. 14, 2022 (GB) ........................................ 2205536

(51) Int. Cl.
*B62J 9/22* (2020.01)
*B62J 9/27* (2020.01)
*B62J 9/23* (2020.01)

(52) U.S. Cl.
CPC .. *B62J 9/27* (2020.02); *B62J 9/22* (2020.02); *B62J 9/23* (2020.02)

(58) Field of Classification Search
CPC .................... B62J 9/22; B62J 9/26; B62J 9/27
USPC ......................................................... 224/427
See application file for complete search history.

(56) References Cited

U.S. PATENT DOCUMENTS

| | | | |
|---|---|---|---|
| 4,798,318 A | 1/1989 | Irwin | |
| 5,110,020 A | 5/1992 | Uhl | |
| 5,127,563 A * | 7/1992 | Chan | B62J 9/26 224/438 |
| 5,460,303 A * | 10/1995 | Downs | B62J 9/26 224/430 |
| 5,788,134 A * | 8/1998 | Matic, Jr. | B62J 9/22 224/463 |
| 7,225,956 B2 * | 6/2007 | Lien | B62J 9/26 224/427 |
| 2006/0043132 A1 | 3/2006 | Lien et al. | |
| 2013/0087424 A1 | 4/2013 | Pratt | |

(Continued)

FOREIGN PATENT DOCUMENTS

| | | |
|---|---|---|
| DE | 19723886 C1 | 11/1998 |
| DE | 102012100380 A1 | 7/2012 |
| DE | 202012011205 U1 | 2/2013 |

(Continued)

OTHER PUBLICATIONS

Examination Report for GB Application No. 2302346.8 mailed Jul. 24, 2023.

(Continued)

*Primary Examiner* — Adam J Waggenspack
(74) *Attorney, Agent, or Firm* — Perilla Knox & Hildebrandt LLP (57) ABSTRACT

There is described a frame mounted bicycle accessory comprising: a collapsible receptacle; an interior stiffener of rigid material situated within the receptacle; a mounting block secured to the stiffener and having a contact portion situated externally of the receptacle for contact with a frame member of a bicycle; and a strap provided on the mounting block and adapted to extend around the frame member to secure the accessory to the frame member. There is also described a kit of parts for assembly to form a frame mounted bicycle accessory.

23 Claims, 8 Drawing Sheets

(56) References Cited

U.S. PATENT DOCUMENTS

2021/0036275 A1  2/2021  Anderson et al.

FOREIGN PATENT DOCUMENTS

| | | |
|---|---|---|
| GB | 190200087 A | 11/1902 |
| GB | 2419633 A | 3/2006 |
| WO | 2020225617 A1 | 11/2020 |

OTHER PUBLICATIONS

Combined Search and Examination Report dated Jun. 17, 2024 in co-pending GB Application No. GB2407172.2.
Combined Search and Examination Report dated Jun. 20, 2024 in co-pending GB Application No. GB2407173.0.

* cited by examiner

FRAME MOUNTED BICYCLE ACCESSORY

This invention relates to a frame mounted bicycle accessory and is particularly, although not exclusively, concerned with a bicycle accessory in the form of a collapsible receptacle such as a bag.

Bikepacking is a popular leisure pursuit which often involves multi-day touring on a bicycle, often an off-road bicycle such as a mountain bike. Everything needed for touring is carried on the bicycle or by the rider. Because bikepacking usually involves off-road cycling, anything carried by the bicycle must be securely attached to avoid movement relative to the bicycle frame, which can cause instability and can potentially bring the carried load into contact with the bicycle wheels, the pedal mechanism or the rider.

Various devices are available for fitting to frame members of a bicycle to enable accessories to be carried, such as Velcro straps, jubilee clip devices and clamping mechanisms utilising split rings which are screwed together around the frame member. A problem with known devices is that they are difficult, or impossible, to fit securely to the frame in a way which avoids rotation of the mounting device about the frame member. Another problem is that many known devices tend to damage the frame member, and are thus unpopular with owners of high-value bicycles. Known devices also lack versatility, in that they are not capable of fitting to a variety of cross sectional shapes and dimensions.

"Soft" packs, such as collapsible bags, pose particular problems. Because such bags, and often their contents, deform when compressed, attaching them to bicycle frame members by means of straps which extend around both the pack and the frame member can be unsatisfactory. As the bag compresses, the strap becomes loose, allowing the bag to pivot around the frame member. Also, the looser strap allows dirt to get between the frame member and the strap or pack, with the result that slippage of the pack and strap around the frame member can damage the coating of the frame member.

US 2021/0036275 discloses a battery pack in the form of a rigid case which can be secured to bicycle frame members by means of a rubber strap which extends between strap anchors provided on the rigid case. Because the case is rigid, the strap anchors provide fixed positions at which the rubber strap is connected. Furthermore, while the rubber strap provides a measure of resistance to rotation of the battery pack about the frame member, the case itself has a hard flat surface which engages the frame member and consequently the pack will not be secured in a manner which is stable enough to resist slippage on the frame member under lateral inertia loads, particularly if heavier loads are to be carried.

According to a broad aspect of the present invention there is provided a frame mounted bicycle accessory comprising a collapsible receptacle provided with a mounting block secured to the exterior of the receptacle and having a contact portion situated externally of the receptacle for contact with a frame member of a bicycle, the mounting block being provided with a strap adapted to extend around the frame member to secure the accessory to the frame member.

According to a more specific aspect, the present invention provides a frame mounted bicycle accessory comprising:
  i. a collapsible receptacle;
  ii. an interior stiffener of rigid material situated within the receptacle;
  iii. a mounting block secured to the stiffener and having a contact portion situated externally of the receptacle for contact with a frame member of a bicycle; and
  iv. a strap provided on the mounting block and adapted to extend around the frame member to secure the accessory to the frame member.

The mounting block may comprise a block body and a pad of resilient material fitted to the block body for contact with the frame member. The pad may be releasably connected to the block body. The pad may have a concave surface, which may be generally V-shaped, for contact with the frame member. The pad may, for example, be made from a suitable resilient but slightly tacky elastomeric material such as a 50 Shore EPDM (ethylene propylene diene monomer rubber).

The mounting block may be secured to the stiffener, for example by a fastener which extends through the material of the receptacle into the stiffener.

The stiffener may comprise an elongate element provided along its length with a plurality of attachment features for receiving the fastener. The attachment features may take any form suitable for receiving the fastener, but they may be tapped holes, and the fastener may be a screwthreaded fastener engaging one of the tapped holes. The stiffener may comprise a peripheral frame, the elongate element extending across the frame. For example, the frame may be rectangular, with the elongate element extending centrally between two parallel elements of the frame.

The stiffener may be made from any suitable rigid material, such as a rigid plastics or composite material, such as carbon fibre, or it may be made from a metallic material such as an aluminium or titanium alloy, or stainless steel.

The stiffener may be accommodated in a pocket situated on the inner surface of the material of the receptacle. The pocket may be defined between a layer of pocket material and the material of the receptacle. In order to prevent leakage of water into the interior of the receptacle past the fastener, the pocket material may be sealed to the material of the receptacle around at least part of the periphery of the pocket. With this measure, water penetrating from the exterior into the pocket will not be able to pass from the pocket to the interior of the receptacle.

The strap may be made from an elastic material such as rubber or a suitable elastomer. A TPU (thermoplastic polyurethane), for example having a hardness of 70 Shore A, is a suitable material. The strap may be made from an elastic material and may comprise a head end and a tail end, the head end having an aperture for receiving the tail end, whereby the strap can be formed into a loop extending around the frame member in use. The strap may be provided with an array of openings between the head end and the tail end, and with a projection which is engageable with a selected one of the openings when the tail end is passed through the aperture to retain the strap in a required looped configuration.

The strap may be fitted to the mounting block in any suitable manner, but in one embodiment the mounting block defines a strap passage for receiving the strap to retain the strap with respect to the mounting block in a releasable manner. The strap passage may have a depth sufficient to accommodate a double thickness of the strap.

The receptacle may have a recess in its external surface, the mounting block being secured to the receptacle in the recess.

Where a stiffener is provided, the stiffener may contact the internal surface of the receptacle and have a profile corresponding to the shape of the recess. The mounting block may be secured to the receptacle by a fastener which extends through the stiffener and the material of the receptacle whereby the material of the receptacle is secured between the stiffener and the mounting block. A clamp may engage the stiffener on a surface of the stiffener away from the material of the receptacle, the clamp being secured to the mounting block by the fastener.

The material of the receptacle may have an opening in which the mounting block is situated, the mounting block having a peripheral flange secured to the material of the receptacle around the opening, and a raised portion directed inwardly of the receptacle from the flange, the raised portion projecting into the interior of the receptacle and defining the strap passage. The peripheral flange may be secured to the material of the receptacle by any suitable technique, such as adhesive bonding, welding or sewing. The raised portion may comprise a peripheral rib surrounding the strap passage. A patch may be secured over the rib to seal the strap passage from the interior of the receptacle.

The raised portion may have a cover panel which seals the strap passage from the interior of the receptacle. The cover panel may have an arcuate concave surface constituting an inner wall of the strap passage.

Where the receptacle is provided with a stiffener, the mounting block may be provided with a raised region which extends through openings in the stiffener and the material of the receptacle, the raised region being engaged by a securing feature situated within the receptacle, for securing the mounting block to the receptacle. The securing feature may be a retaining clip, and may be provided with rails which engage parallel grooves provided in the mounting block.

The raised region of the mounting block may define the strap passage.

The mounting block may be of sufficient length to accept two straps spaced apart from each other, possibly in separate strap passages. Alternatively, the mounting block may be one of at least two spaced apart mounting blocks secured to the receptacle, each mounting block having a respective strap.

A stiffening baton may extend between the spaced apart mounting blocks. The baton may be secured to the mounting blocks in any suitable way, for example by flexing it to engage appropriately formed locating apertures. Alternatively, the baton may be located with respect to the mounting blocks by the respective securing features. In one embodiment, the mounting block is provided with a raised region which extends through openings in the stiffener and the material of the receptacle, the raised region being engaged by a securing feature situated within the receptacle, for securing the mounting block to the receptacle, the baton being located with respect to the mounting blocks by the respective securing features.

Each mounting block may be provided with a recess accommodating an end region of the baton, the respective retaining clips engaging the baton to retain its end regions within the respective recesses.

The receptacle may be adapted for containing various items. For example the receptacle may be in the form of a bag of flexible material.

According to a second aspect of the present invention there is provided a kit of parts for assembly to form a bicycle accessory as defined above, the kit comprising:
 the receptacle,
 the stiffener,
 the mounting block,
 the fastener, and
 the strap.

Where the mounting block is retained by a retaining clip, the kit may further comprise the retaining clip.

Where the mounting block has a peripheral flange, the kit may comprise the receptacle with the mounting block secured to it by means of the flange.

Where the mounting block is provided with the pad, the kit may comprise the block body and the pad as separate components.

The kit may comprise a plurality of mounting blocks.

Where a stiffening baton is provided, the kit may comprise the baton.

The kit may comprise a plurality of straps of different length.

Another aspect of the present invention provides a frame mounted bicycle accessory comprising:
 a collapsible receptacle;
 an interior stiffener of rigid material situated within the receptacle;
 a mounting block secured to the stiffener and having a contact portion situated externally of the receptacle for contact with a frame member of a bicycle;
 a strap provided on the mounting block and adapted to extend around the frame member to secure the accessory to the frame member; wherein
 the mounting block is provided with a raised region which extends through openings in the stiffener and the material of the receptacle, the raised region being engaged by a retaining clip situated within the receptacle, for securing the mounting block to the receptacle.

The mounting block may be one of at least two spaced apart mounting blocks, the accessory further comprising a stiffening baton which extends between the spaced apart mounting blocks.

The present invention also provides a bicycle provided with a bicycle accessory as defined above, or assembled from a kit as defined above, which accessory is mounted on a frame member of the bicycle by means of the or each strap.

For a better understanding of the present invention, and to show more clearly how it may be carried into effect, reference will now be made, by way of example, to the accompanying drawings, in which.

Figure 1:
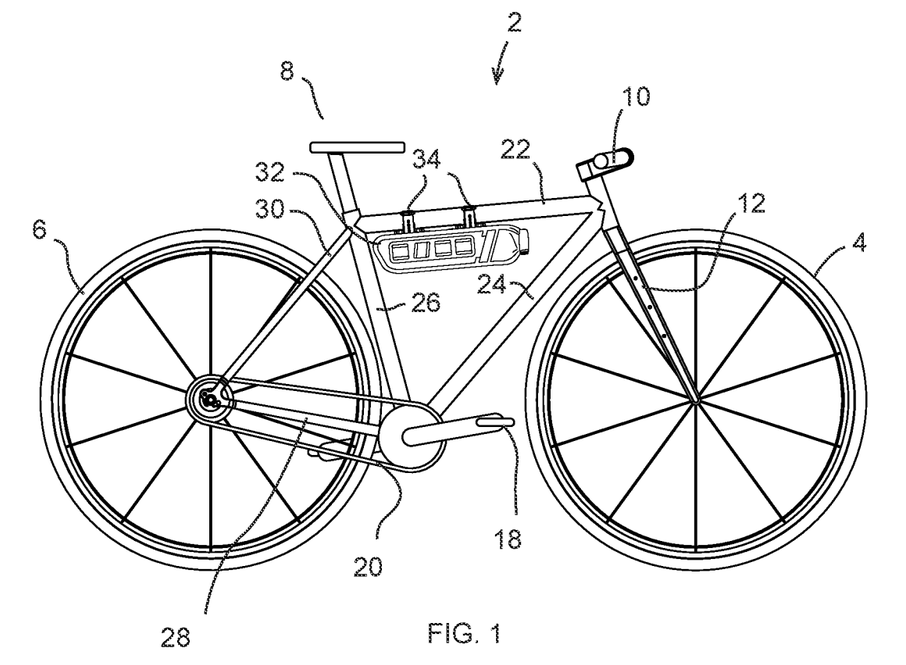
FIG. 1 shows a bicycle having a frame mounted accessory in the form of a bag fitted to the top tube of the frame of the bicycle.
Figure 2:
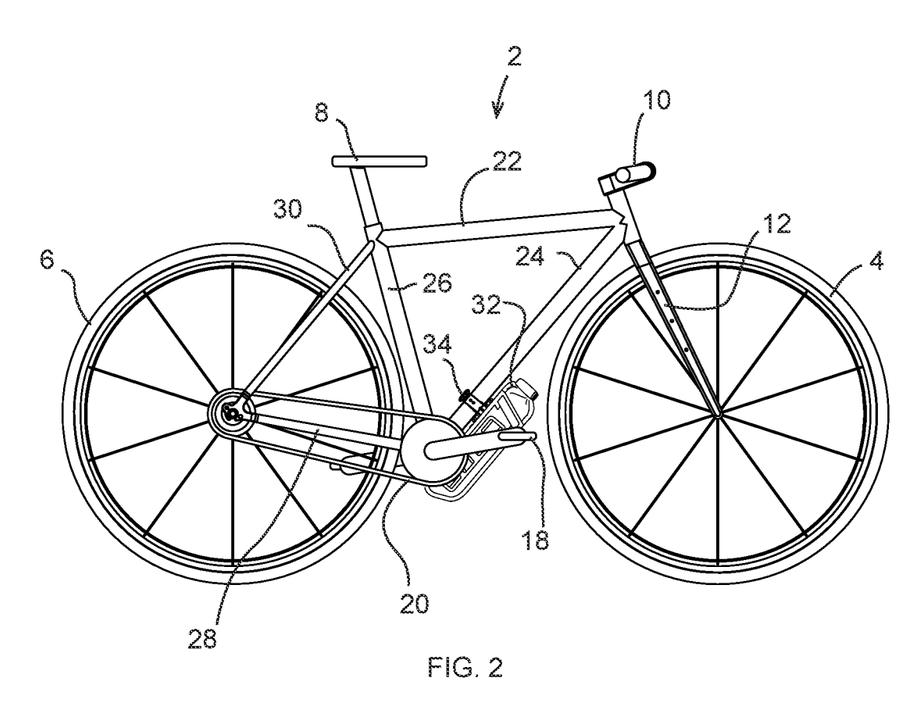
FIG. 2 corresponds to FIG. 1, but shows the accessory fitted to the down tube of the frame.

Although the bicycle shown in FIGS. 1 and 2 is of generic form, the present invention may be applied to accessories such as luggage packs for use with mountain bikes suitable for bikepacking. Although not shown, the bicycle may be provided with one or more luggage racks, panniers and other accessories for carrying the equipment needed for multi-day touring.

The bike of FIGS. 1 and 2, as is conventional, comprises a frame 2 carrying front and rear wheels 4, 6, a saddle 8 and handlebars 10 for steering the front wheel 4 which is supported by a front fork 12. Pedals 18 drive the rear wheel 6 through a chain 20. In this specification, the expressions "frame" and "frame member" are used in a broad sense to embrace not only the main "diamond" frame which includes a top tube 22, a down tube 24 and a seat post 26, but also other structural members of the bike including, for example, the front fork 12, chain and seat stays 28, 30, and the handlebars 10.

Some frame members of the frame 2 are provided with brazed-in tapped inserts to which accessories such as cages for water bottles can be fixed. By using these tapped inserts the water bottles or other accessories, such as a pump or a luggage bag (also referred to as a cargo pack), can be rigidly fixed to the frame in a manner which avoids movement of the accessory. Such movement can cause fluctuating changes in weight distribution so destabilising the bike, and can bring the accessory into contact with the rider or moving parts of the bike.

It is sometimes desirable to carry additional accessories on the frame at locations where there are no tapped inserts. For example, as shown in FIG. 1, a luggage bag 32 is carried by the top tube 22, to which the bag 32 is secured by straps 34. Alternatively, as shown in FIG. 2, the luggage bag 32 can be secured to the down tube 24.

Figure 3:
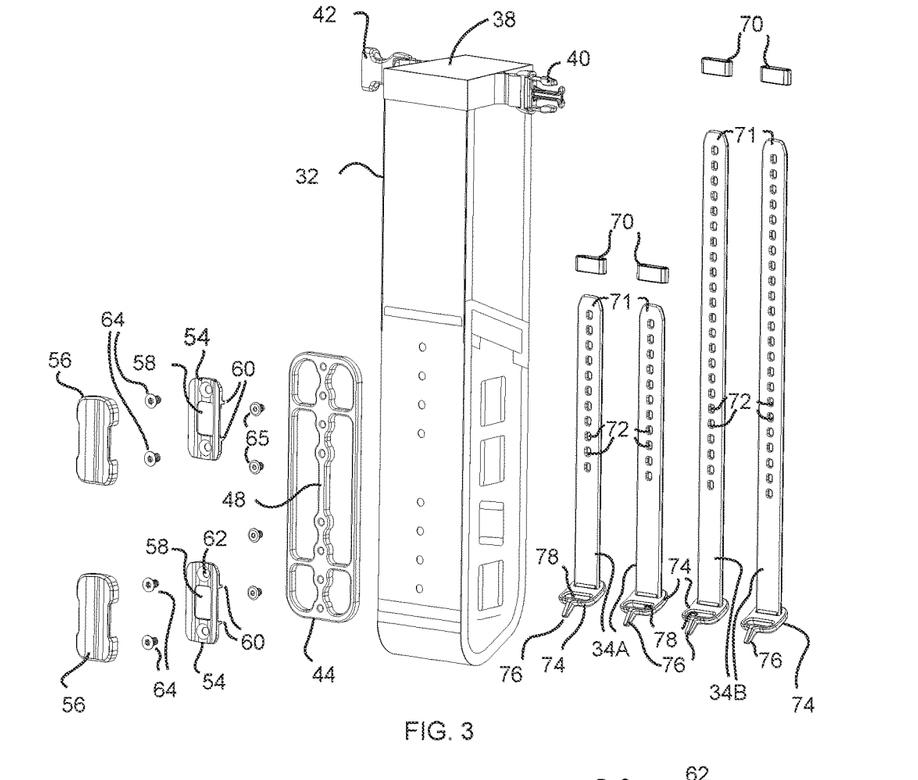
FIG. 3 is an exploded view of the accessory FIGS. 1 and 2, including alternative components.

FIG. 3 is an exploded view of a kit of parts comprising the luggage bag 32 and its fittings. The bag 32 comprises a body 36 which is collapsible, in the sense that it is not so rigid that it can withstand moderate compressive forces applied to it. For example, the bag may be made from a waterproof textile or sheet material, such as a 420D nylon or other plastics material, which is sufficiently stiff to maintain its shape when unstressed, but which will flex if, for example, baggage items are pressed forcefully into the bag, or if straps or the like are tensioned around the periphery of the bag. As can be appreciated from FIGS. 3 and 8, the bag 32 has an elongate form, with a generally rectangular or trapezium-shaped cross-section, although it could have other cross-sectional shapes, for example generally circular.

The bag 32 has a mouth 38 at one end which can be closed by hand by flattening the mouth 38 and rolling the material of the bag downwards from the mouth 38 (in the orientation shown in FIG. 3), and then securing the bag material in the rolled-up position by interconnecting buckle elements 40, 42.

Figure 4:
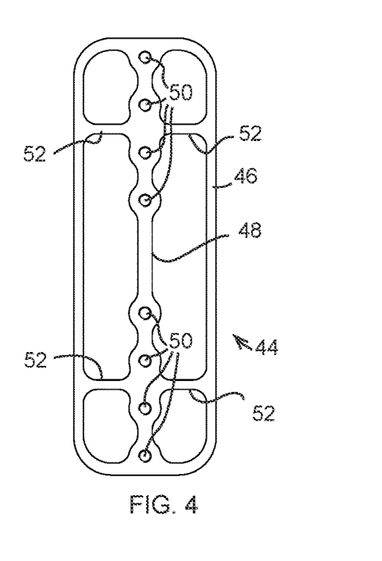
FIG. 4 is a front view of a stiffener of the accessory of FIG. 3.

The bag 32 is fitted with a stiffener 44. The stiffener 44 is shown in plan view in FIG. 4 and is made from a suitable rigid material such as aluminium or other lightweight metal or alloy. Other materials may be suitable, such as a stiff plastics material. The stiffener 44 has a generally open rectangular form having a peripheral frame 46 and an elongate element or spine 48 which extends centrally of the stiffener 44 between the shorter sides of the peripheral frame 46. The spine 48 is provided along its length with a series of tapped openings 50. In the embodiment shown, the tapped openings 50 are disposed in two groups of four openings, the openings of each group being equally spaced apart from one another. Strengthening webs 52 interconnect the longer sides of the peripheral frame 46 and the spine 48. These strengthening webs 52 meet the spine 48 at positions midway along the respective groups of openings 50.

The kit shown in FIG. 3 also comprises a pair of block bodies 54 and a corresponding pair of pads 56. These are shown on a larger scale in FIGS. 5 and 6. Each block body 54 is made from a rigid material, such as a metal alloy (e.g. an aluminium alloy) and is of generally rectangular form having a central opening 58 situated between a pair of ribs 60. Countersunk holes 62 are provided at opposite ends of the central opening 58 for receiving screws 64. Further screws 65 are provided for securing the stiffener 44 within the bag 32 as will be described below.

Figure 5:
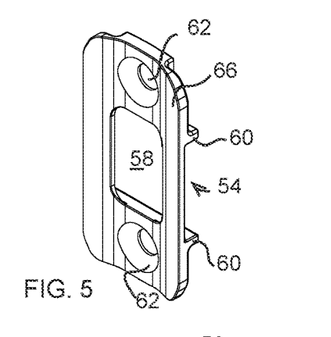
FIG. 5 shows a block body of a mounting block of the accessory of FIG. 3.

Each block body 54 has a concave face 66 on the side away from the ribs 60, the face 66 being curved about an axis which is parallel to the longer side of the block body 54.

Figure 6:
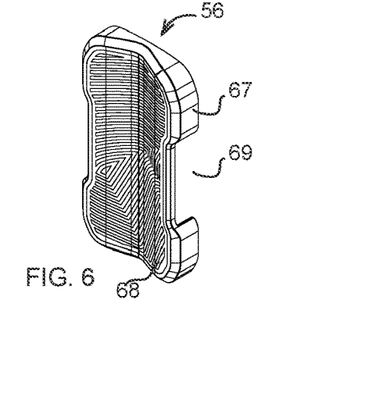
FIG. 6 shows a pad for fitting to the block body of FIG. 5.

Each pad 56 is made from an elastomeric material such as rubber and has a rectangular shape similar to that of the block bodies 54 but has a rear profile configured to fit over the respective block body 54, engaging the concave face 66. The front face 68 of the pad 56 is concave and is generally V-shaped as viewed in cross-section taken perpendicular to the longer axis of the pad. The front face 68 has a pattern 80 of ridges and grooves to enhance frictional resistance to sliding, as will be described below. A peripheral skirt 67 extends partially around the pad 56, but is interrupted along the longer sides of the pad to form recesses 69.

The kit shown in FIG. 3 also comprises two pairs of straps 34. As can be seen from FIG. 3, one pair of the straps 34A has a shorter length than the other pair of straps 34B. The straps 34 are provided with retaining loops 70.

The straps 34 are made from a resilient material, for example an elastomeric material, which can stretch under tension. Each strap 34 has a tail end 71 and is provided with an array of holes 72 extending away from the tail end 71 over the major part of its length. Each strap 34 also has a head end in the form of a retainer 74 provided with a retaining pin 76 and a slot 78 shaped to receive the tail end 71.

Figure 7:
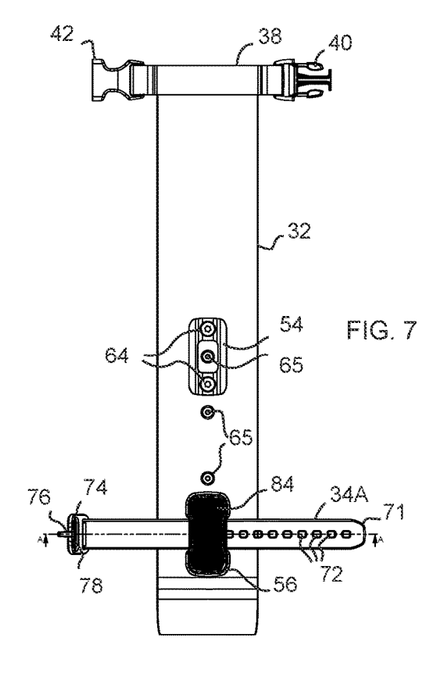
FIG. 7 is a view of the face of the accessory of FIG. 3 when partially assembled.

FIG. 7 shows the kit of FIG. 3 partially assembled. The stiffener 44 (not visible in FIG. 7) is accommodated in a pocket 80 formed in the interior of the bag 32 (see FIG. 8) by a layer of pocket material 82 which is sealed, for example by adhesive bonding or welding (such as radio frequency welding), around at least its side and lower edges to the material of the bag 32. A closure (not shown) such as a Velcro® flap may be provided to close the top edge of the pocket 80. The stiffener 44 is secured to the material of the bag 32 by the screws 65. It will appreciated that other forms of securing feature could be used to secure the stiffener 44 to the bag 32.

In FIG. 7, one of the block bodies 54 is visible at an upper position on the bag 32 and is secured to the bag 32 by two of the screws 64 which extend through the countersunk holes 62 in the block body 54 and through the material of the bag 32 into two of the tapped bores 50 in the stiffener 44. The other block body 54 is secured to the bag 32 at a lower position in the same manner as the block body 54 at the upper position, but is concealed in the view of FIG. 7 by the respective pad 56 which is fitted over the block body 54 to form a mounting block 84. One of the straps 34A is shown in FIG. 7 extending between the mounting block 84 and the material of the bag 32. The strap is accommodated in a strap passage formed by the space 61 provided between the ribs 60 on the block body 54 and the bag material, and extends through the recesses 69 in the pad 56.

Figure 8:
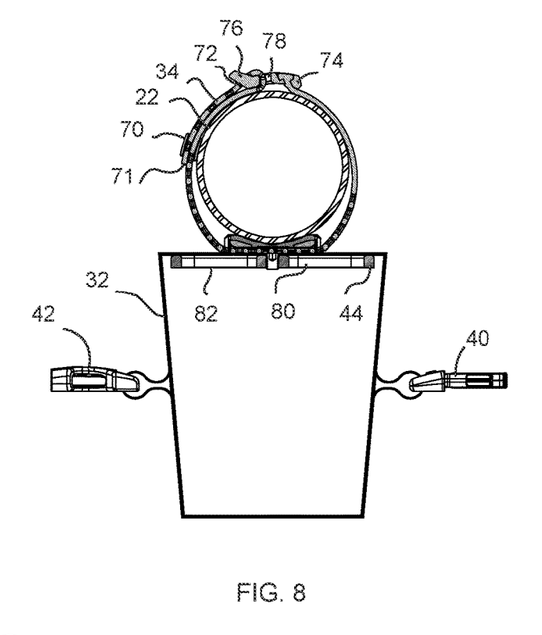
FIG. 8 is a sectional view on the line A-A in FIG. 8 showing the accessory fitted to a frame member of a bicycle.

As shown in FIG. 8, the accessory comprising the bag 32 and its fittings assembled as shown in FIG. 7, with the additional pad 56 installed over the block body 54 in the upper position, is fitted to the selected frame member (shown as the top tube 22 in FIG. 8). To do this, the mounting blocks 84 are placed against the tube 22 with the concave front faces 68 of the pads 56 in direct contact with the frame tube 22. The straps 34 are then each passed through the strap passages in the respective mounting blocks 84 and then wrapped around the tube 22. The tail end 71 is passed through the slot 78 in the head end. The strap is then pulled to tension it until one of the holes 72 can be placed over the retaining pin 76, as shown in FIG. 8. Sufficient tension is applied to the strap 34 to ensure firm contact between the tube 22 and the ridged surface of the pad 56 so that the frictional contact between the pad 56 and the frame tube 22 resists the tendency for the assembly to slide relatively to the tube 22, either lengthwise along the tube 22 or around the axis of the tube 22. The loop 70 retains the tail end of the strap 34. The combined effect of the pad 56 and the elastomeric strap 34 is to achieve a firm mounting of the bag 32 on the selected frame tube to avoid any displacement during normal cycling activity.

Bicycle frame tubes differ in shape and size, and consequently the longer straps 34B are provided to ensure an adequate strap length for larger frame tubes.

It will be appreciated that the positions of the mounting blocks 84 on the bag 32 can be varied by appropriate selection of the tapped holes 50 in which the screws 64 are inserted.

Figure 9:
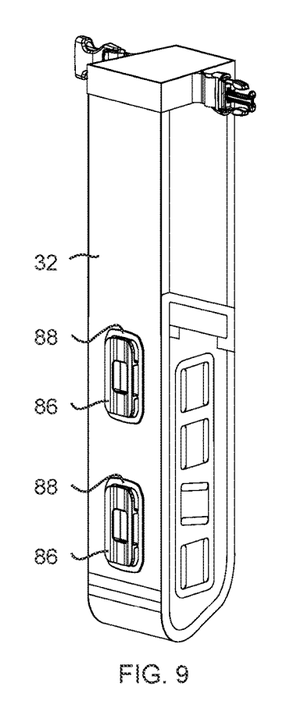
FIG. 9 shows an alternative embodiment of a frame mounted accessory in the form of a pack.

FIG. 9 shows an alternative arrangement to that of FIGS. 3 to 8. In the variant of FIG. 9, the block bodies 54 with the screw holes 62 are replaced by alternative block bodies 86 which lack the screw holes 62 but are provided with a peripheral skirt 88. The skirt 88 is moulded integrally with the rest of the block body 86. The block body 86 is secured to the bag 32 at the skirt 88 by any suitable bonding technique. For example, where the block body 86 and the bag 32 are made from, or incorporate, a plastics material, the skirt 88 may be fixed to the bag 32 by thermal or radio frequency welding, with the material of the bag 32 fusing to the material of the skirt 88. Alternatively, adhesive bonding may be employed.

In the embodiment of FIG. 9, the stiffener 44, and consequently also the pocket 80 may be omitted thus reducing the cost of the bag 32 and minimising the assembly work required of the user. As with the embodiment of FIGS. 3 to 8, the mounting blocks 86 are provided with the pads 56 and the straps 34. Mounting of the bag 32 on the frame member 22 is thus achieved by means of the straps 34 in the same manner as described with reference to the embodiment of FIGS. 3 to 8.

In the embodiments described with reference to FIGS. 1 to 9, the free end of each strap 34 is retained by the loop 70. While this provides a certain degree of control for the free end of the strap 34, such control is not always possible, and the free end of the strap 34 can project into the path of the legs, for example the thighs, of the rider. This can be a source of irritation, and, when riding for long periods, can lead to discomfort and abrasion of clothing or the rider's skin. In order to avoid this, the ribs 60 may be extended, and the recess 69 correspondingly enlarged, in order to enable the free end of the strap 34 to be tucked into the enlarged recess, where it can be kept out of the way of any part of the rider.

A problem with this approach is that extending the ribs 60 effectively moves the bag 32 further from the contact face of the pad 56, and consequently from the frame tube 22. This increases the moment arm from the centre of gravity of the bag 32 to the central axis of the frame tube 22, consequently increasing the possibility of the bag 32 swivelling about the frame tube 22.

Figures 10, 11:
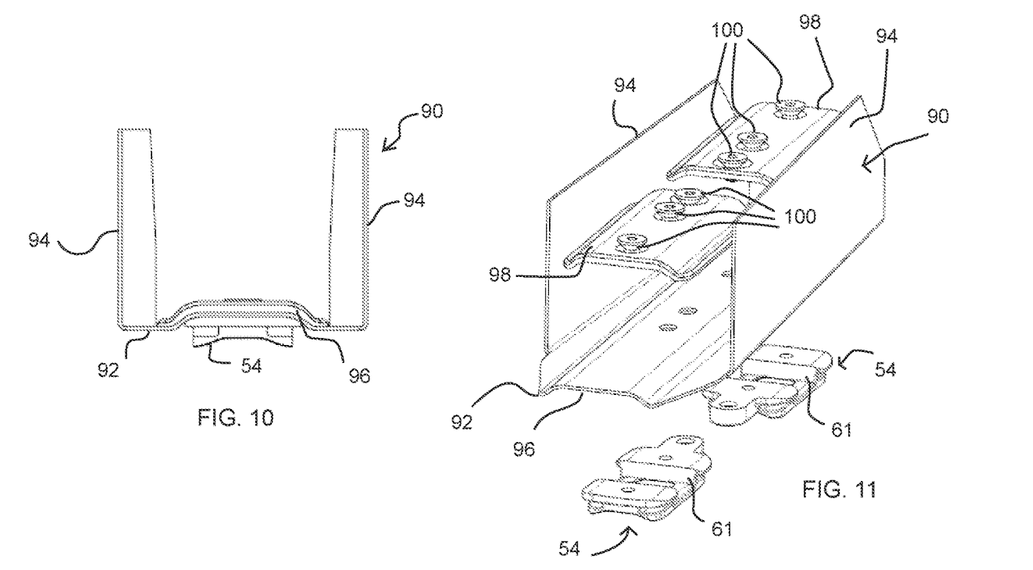
FIG. 10 is a sectional view of a variant of the pack shown in FIG. 9.
FIG. 11 is an exploded view of the pack shown in FIG. 10.

In order to avoid this drawback, the connection between the mounting blocks and the bag may be modified as shown in FIGS. 10 and 11. In this modification, the bag 32 is provided with an internal stiffener 90 in the form of a channel-shaped structure formed from a sheet of a suitable stiff metallic or plastics material, such as high-density polyethylene (HDPE). The stiffener 90 lies within the flexible material of the bag 32 (not shown in FIGS. 10 and 11), and has a base 92 and a pair of wings 94 which extend away from the base 92 and provide support for the sides of the bag 32. The base 92 has a shallow recess 96 which extends in the lengthwise direction of the stiffener 90. Two of the block bodies 54 are secured to the base 92 of the stiffener 90 by respective clamps 98 which are secured to the stiffener 90, and hence to the bag 32, by screws 100 which extend through holes in the base 92 of the stiffener 90, and through the material of the bag 32 itself.

The clamps 98 are profiled to match the shape of the recess 96. It is possible for the recess 96 to be formed in the base 92 as the stiffener 90 itself is formed, or alternatively, the base 92 may initially be flat, and the recess 96 may be created by deforming the base 92 when the base 92 is sandwiched between the block bodies 54 and the profiled clamps 98.

Each of the block bodies 54 has a space 61, corresponding to the space 61 of the block body shown in FIG. 5, which creates a strap passage of sufficient depth to accommodate a double thickness of the strap 34. Consequently, as will be described with reference to FIG. 27, the strap 34 can be passed through the space 61 and tensioned as described with reference to FIG. 8, and subsequently the tail end 71 of the strap 34 can be looped back and passed again into the space 61 where it is retained to prevent it extending freely outwardly of the frame tube 22. It will be appreciated that part of the block body 54, and part of the strap passage formed by the space 61, lie in the recess 96, so that these parts are within the general overall envelope of the bag 32. This means that the bag 32 sits closer to the frame tube on which the bag is secured, despite the extra height of the block body 54 required to accommodate the double thickness of the strap 34.

FIGS. 12 to 17 show alternative structures for securing a block body 54 to a bag, while enabling a double thickness of the strap 34 to be accommodated by the block body 54 while minimising the projection of the block body 54 outwardly of the bag 32.

Figure 12:
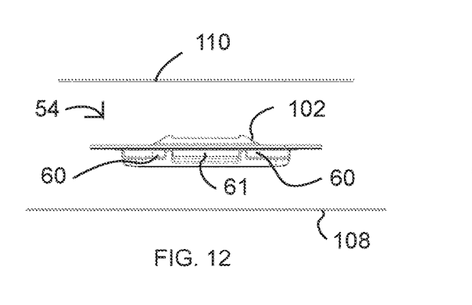
FIG. 12 shows a mounting block to be secured between two sheets of pack material.
Figure 13:
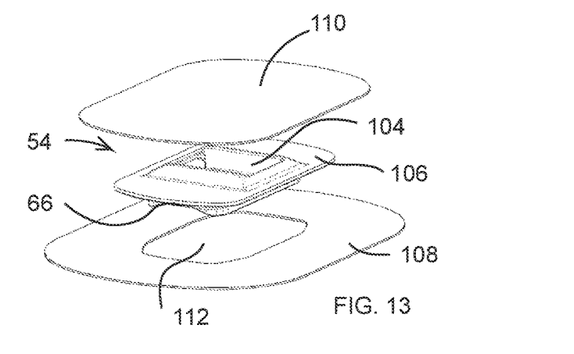
FIG. 13 is an exploded view of the mounting block and pack material of FIG. 12.
Figure 14:
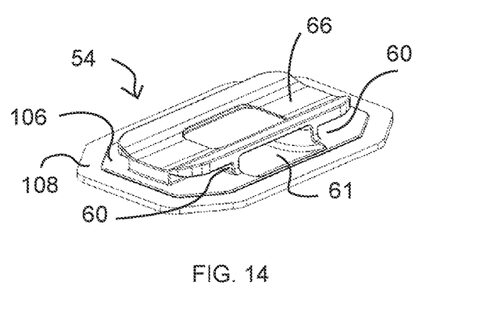
FIG. 14 shows the outer face of a mounting block having a curved strap recess.

In the embodiment shown in FIGS. 12 and 13, the block body includes the ribs 60 providing the space 61 of the block body of FIG. 5. However, in the embodiment of FIG. 12, the block body has a raised portion 102 which creates a peripheral rib extending around an opening 104. The block body 54 also has a peripheral flange 106. FIGS. 12 and 13 show the bag material 108 and a patch 110. Both the bag material 108 and the patch 110, like the block body 54, are made from a thermoplastic material. The bag material 108 is formed with an opening 112 which is large enough to receive the portion of the block body 54 having the concave face 66, but smaller than the flange 16. Consequently, the block body 54 can be placed into the opening 112 with the flange 16 overlying the material 108 of the bag 32. The patch 110 is placed over the block body 54 and the three components are secured together by radio frequency welding, although other techniques, such as heat or solvent welding, or adhesive bonding, may be used. Stitching could also be used, but separate measures would then need to be taken to waterproof the connection. The patch 110 serves to close the opening 104, to provide a seal against liquid penetration into or out of the bag 32.

The structure shown in FIGS. 12 and 13 thus provides a strap passage of sufficient width to accept a double thickness of the strap 34 with the strap being accommodated, at least partly, within the peripheral rib 102 in the block body 54 and so intrudes into the interior of the bag material 108. As a result, the external profile of the block body on the exterior of the bag is reduced or minimised, so minimising the moment arm between the centreline of the frame member 22 and the centre of gravity of the bag and its contents.

The block body 54 of FIGS. 12 and 13 can be manufactured in any suitable way, but one possibility is to form it by injection moulding. This can be accomplished relatively simply using a straightforward open and shut injection moulding tool having cores movable along a straight axis to form the space 61.

Figure 15:
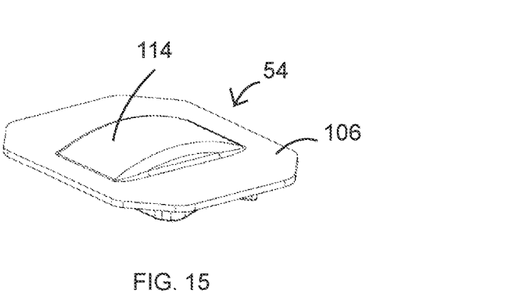
FIG. 15 shows the inner face of the mounting block of FIG. 14.
Figure 16:
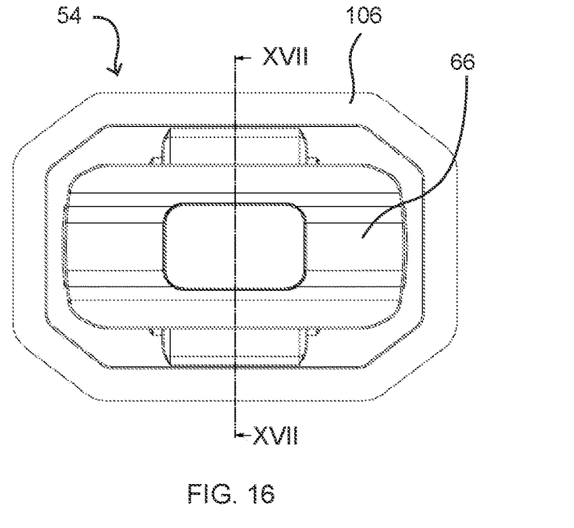
FIG. 16 is a plan view of the mounting block of FIGS. 14 and 15.
Figure 17:
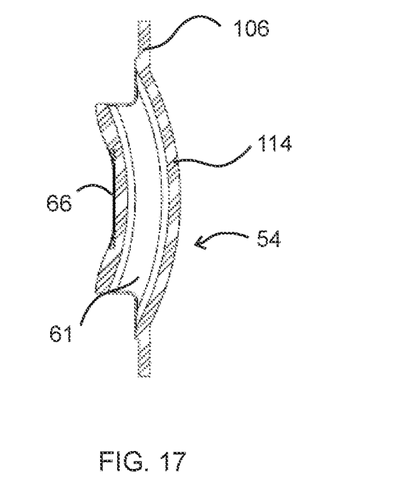
FIG. 17 is a sectional view taken on the line XVII-XVII in FIG. 16.

FIGS. 14 to 17 show a variant of the block body 54 of FIGS. 12 and 13. As shown in FIG. 15, the opening 104 of FIG. 13 is closed by a cover panel in the form of an arcuate bridge 114 which projects into the interior of the bag 32. The inner surface of the cover panel 114 is convex with an arcuate profile. As a result, the strap passage formed by the space 61 has a curved shape, as seen in FIG. 17, so that the double thickness of the strap 34 (not shown) can extend partially into the interior of the bag 32, so enabling the bag to lie as close as possible to the frame member 22. The block body 54 shown in FIGS. 14 to 15 can, like the block body of FIGS. 12 and 13, be manufactured as a single integral component, including the cover panel 114, by an injection moulding process, although using cores which are movable along an arcuate path of constant radius corresponding to the shape of the inner surface of the cover panel 114. As an alternative, the cores may run along straight paths which are inclined to each other, to form a V-shaped inner surface of the cover panel 114.

As with the embodiment of FIG. 12 or 13, the block body of FIGS. 14 to 17 may be secured to the bag 32 by welding the flange 106 to the bag material 108 around the opening 112 (see FIGS. 12 and 13). However, with the block body 14 to 17, no patch 110 is required, because the arcuate bridge 114 avoids any aperture across the block body 54 between the interior to the exterior of the bag.

Although the embodiments described above are intended to be secured to the frame tube 22 by means of the straps 34, in some instances it may be desirable to secure the block bodies 54 to the frame of the bike 2 using pre-existing fastening systems such as brazed-in tapped inserts. For this purpose, the block body 54 may be modified to make provision for receiving screws or other fasteners to enable securing of the block body to the bike frame using the tapped inserts. A modified version of the embodiment shown in FIGS. 14 to 17 is shown in FIGS. 18 to 20, and includes an extension 116 provided with holes in 18 for receiving screws to fasten the block body 54 to a frame tube 22 as represented in FIG. 20.

Figures 18, 19:
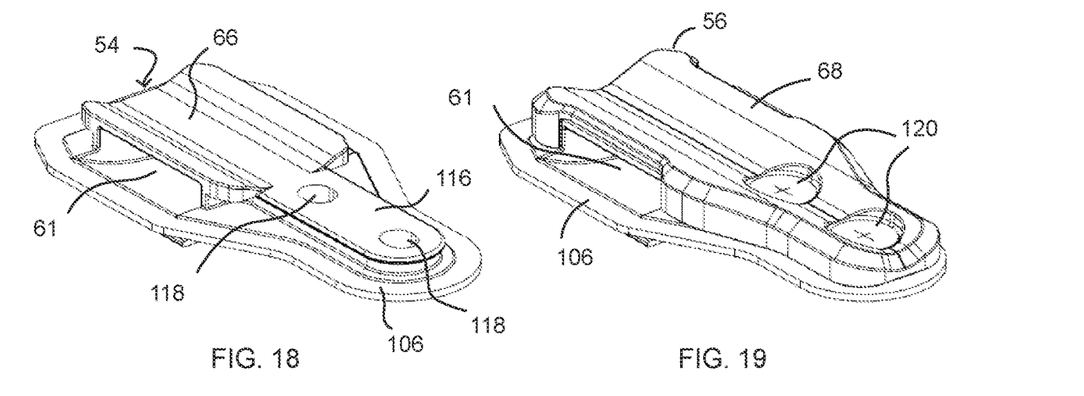
FIG. 18 shows a variant of the mounting block of FIGS. 14 to 17, having provision for screw fixing.
FIG. 19 shows the mounting block of FIG. 18 provided with a pad.

FIG. 19 shows the pad 56 fitted to the block body 54. The pad 68 is provided with openings 120 corresponding to the holes 118. The mounting blocks 54, 56 may be supplied with the openings 120 closed by a thin membrane of the material of the pad 56, which can be pierced when fastening the mounting block 54, 56 to the tapped inserts. If no such screw-fastening is required, the thin membranes provide additional security against water penetration into the bag 32.

Figure 20:
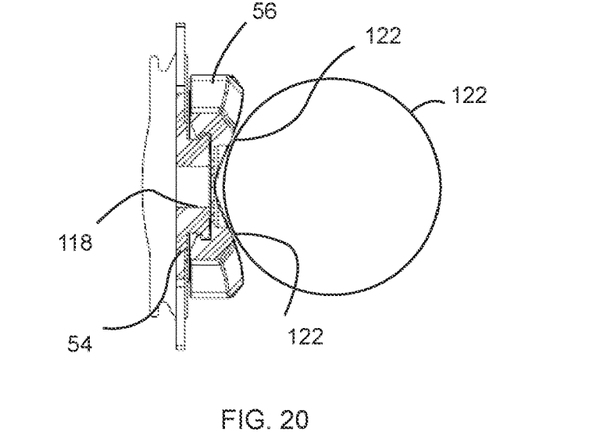
FIG. 20 shows the mounting block and pad of FIG. 19 placed against a bicycle frame member.

It will be appreciated from FIG. 20 that the mounting block 54, 56 provides additional support of the bag 32 on the frame tube 22 at the locations 122 so reducing the tendency of the bag to rock about the screws extending through the holes 118 into the tapped inserts on the frame tube 22.

Figure 21:
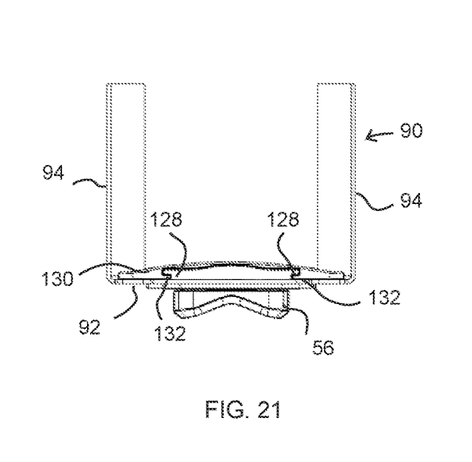
FIG. 21 shows the mounting pad of FIG. 19 fitted to a pack stiffener.
Figure 22:
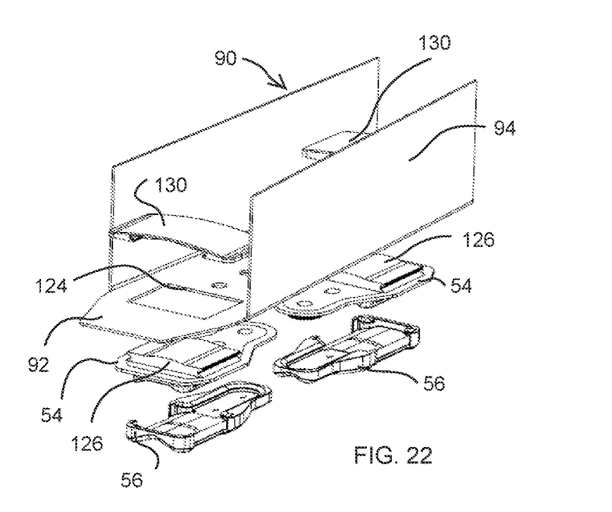
FIG. 22 is an exploded view corresponding to FIG. 21, and shows two mounting blocks fitted to a common pack stiffener.

FIGS. 20 to 22 show an alternative structure for retaining the block bodies 54 on the bag 32, by securing them to a stiffener 90 of the same general form as that shown in FIGS. 10 and 11. The stiffener 90 has openings 124 which receive raised regions 126 of the block bodies 54. The raised regions 126 at opposite sides of the raised portions 126 define, with a lower part of the respective block body, parallel grooves 128.

Securing features in the form of clips 130 are fitted over the raised regions 126 and have rails 132 which fit within the grooves 128. It will be appreciated that other mechanisms instead of the clips 130 can be employed as securing features to engage the raised regions 126 and secure the block bodies to the stiffener 90.

Before assembly, the block bodies 54 are welded or otherwise secured to the outer material of the bag 32 (not shown in FIGS. 21 and 22) with the raised regions 126 projecting through an opening formed in the bag material. The stiffener 90 is then inserted into the bag and the bag material, with the welded block bodies 54, is manipulated to pass the raised regions 126 through the openings 124 in the stiffener 90. The clips 130 can then be slid over the raised regions 126, with the rails 132 engaging in the grooves 128. This secures the block bodies 54 to the stiffener 90. The welded connection between the bag material and the block bodies 54 prevents water penetration to the interior of the bag.

Figure 23:
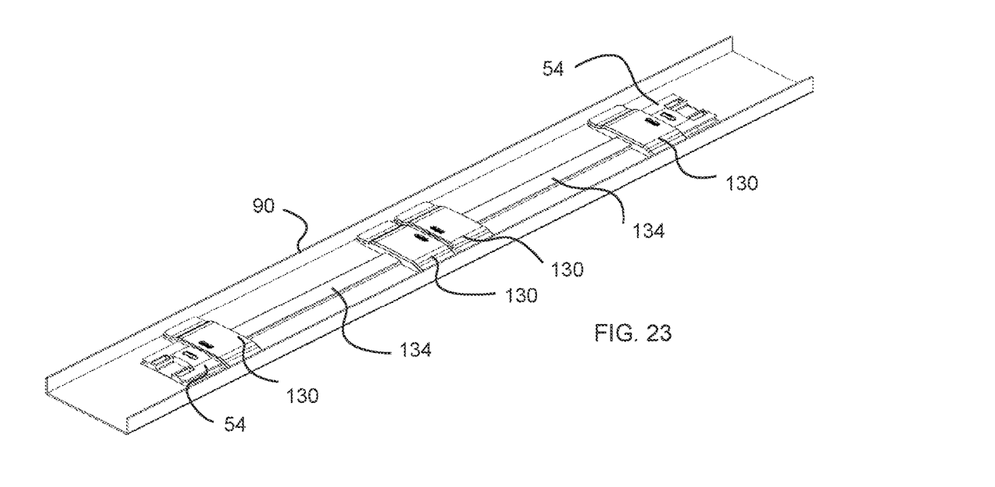
FIG. 23 shows a pack stiffener provided with three mounting blocks and stiffening batons.
Figure 24:
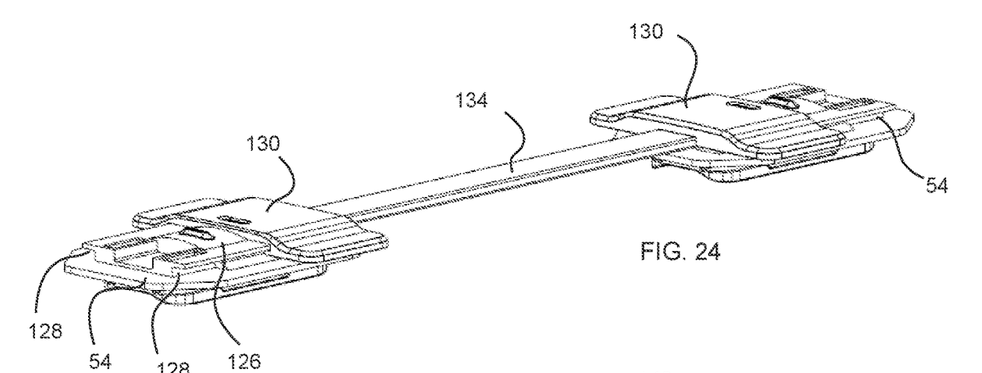
FIG. 24 shows a pair of mounting blocks in conjunction with a stiffening baton and securing clips.
Figure 25:
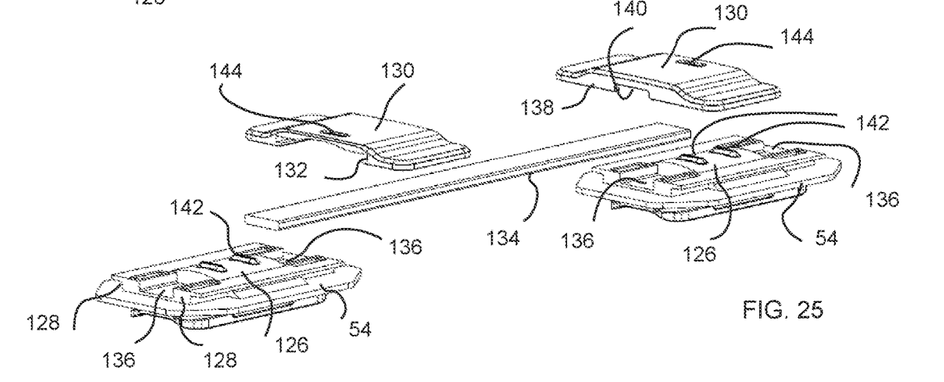
FIG. 25 is an exploded view of the assembly of FIG. 24.

FIGS. 23 to 25 show additional stiffening batons 134 fitted to a modified stiffener 90 by the clips 130. The batons 134 may be made of any suitable material such as metal alloy, plastics or composite material such as carbon fibre. As with the embodiment of FIGS. 21 and 22, the block bodies 54 are welded to the bag material (not shown in FIGS. 23 to 25) and have raised regions 126 defining the grooves 128.

The raised regions 126 project through openings similar to the opening 124 in FIG. 22, and are retained within the channel-shaped stiffener 90 by the clips 130. The raised regions 126 of the block bodies 54 have channels 136 which open at one end of the raised region 126 and extend partially into the raised region 126. The clips 130 have end walls 138 provided with recesses 140 corresponding to the channels 136. The raised regions 126 of the block bodies 54 have detents 142 and the clips 130 have corresponding slots 144.

To assemble the structure shown in FIGS. 23 to 25, the block bodies 54, welded at openings in the bag material, are offered to the stiffener 90 so that the raised regions 126 pass into the openings 124. The batons 134 are then placed with their ends in the oppositely disposed channels 136 of the raised regions 126. The clips 130 are then engaged with the grooves 128 with the recesses 140 receiving the batons 134, and are displaced in a sliding movement over the block bodies 54 until the detents 142 are engaged in the respective slots 144. Although the detents 142 are employed in the embodiment of FIGS. 23 to 25, they can be dispensed with if the friction between the block bodies 54 and the clips 130 is sufficient to hold the clips 130 in position.

It will be appreciated that the block bodies 54 of FIGS. 23 to 25 are symmetrical about a transverse plane, having the channels 136 at opposite ends. As will be appreciated from FIG. 23, this means that the stiffener 90 can receive more than one of the batons 134, with the central block body 54 (in FIG. 23) receiving the ends of the two batons 134, secured by respective clips 130.

Figure 26:
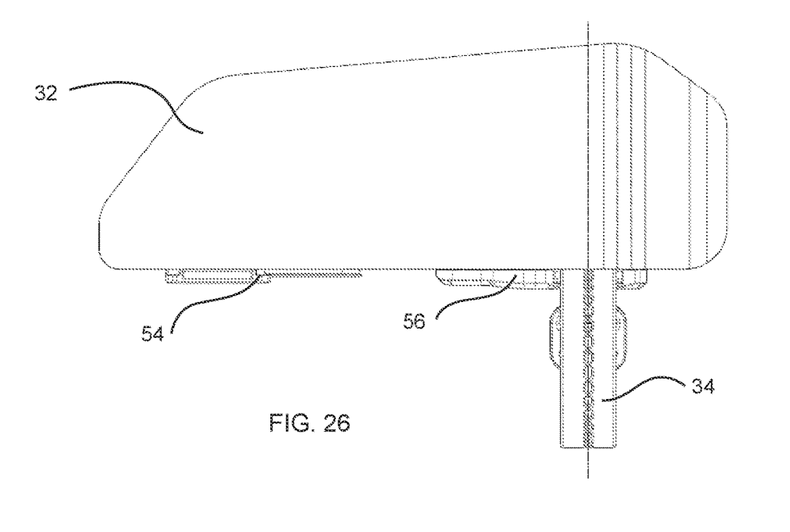
FIG. 26 shows a pack provided with mounting blocks as shown in FIG. 19, in conjunction with a securing strap.
Figure 27:
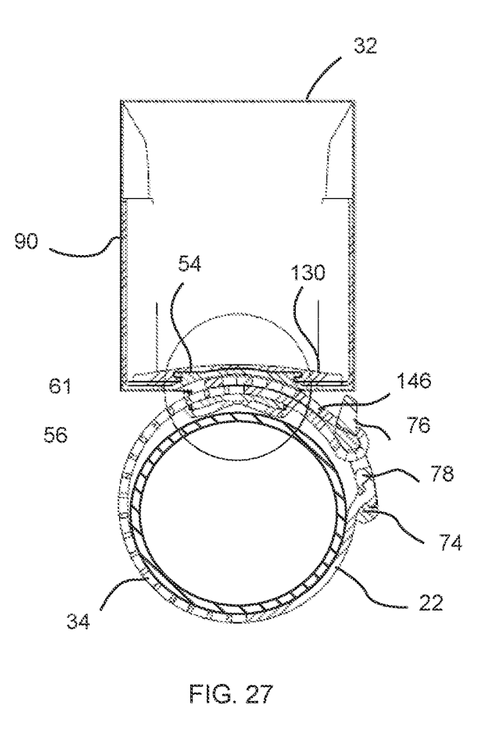
FIG. 27 is a sectional view of the pack shown in FIG. 26.
Figure 28:
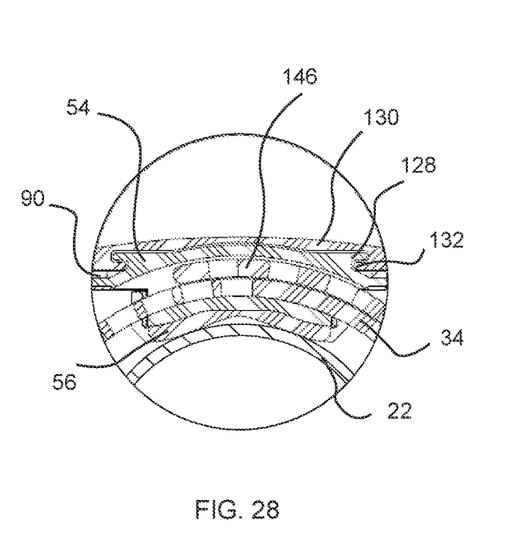
FIG. 28 is an enlarged view of the encircled region in FIG. 27.

FIGS. 26 to 28 illustrate how the bag 32 constructed as described with reference to FIGS. 21 and 22 is secured to a bicycle frame, represented by the top frame member 22, by the strap 34. It will be appreciated that the strap 34 is passed through the strap passage formed by the arcuate channel 61 in the block body 54 and is passed from the inside through the slot 78 in the retainer 74 at the head end of the strap 34. The end of the strap emerging from the slot 78 is pulled to tension the strap 34 around the top tube 22 and is then folded back over the retaining pin 76 to secure the strap under tension. The free end region 146 of the strap 34 is then passed back through the arcuate channel 61 over the region of the strap already present in the channel 61. It will be appreciated that, owing to the arcuate shape of the channel 61, the free end region 146 lies inwards of the general envelope of the bag 32, and consequently its thickness does not result in the bag 32 being displaced away from the centreline of the top tube 22.

Although the mounting devices described above have been referred to as fitted to the top tube 22 of the bicycle frame 2, the same mounting devices can be used for attaching accessories to other parts of the bicycle. Also, although the invention has been described in the context of a mountain bike, the mounting devices can also be used with other types of bicycle.

Also, although the pad 56 has been described as a separate component from the block body 54, the pad 56 could alternatively be formed by overmoulding onto the block body 54, so that the two parts are not readily separable from each other.

For the avoidance of doubt, the present application extends to the subject-matter described in the following numbered paragraphs (referred to as "Para" or "Paras"):

Para 1. A frame mounted bicycle accessory comprising a collapsible receptacle provided with a mounting block secured to the receptacle and having a contact portion situated externally of the receptacle for contact with a frame member of a bicycle, the mounting block being provided with a strap adapted to extend around the frame member to secure the accessory to the frame member.

Para 2. A bicycle accessory as in Para 1, in which the mounting block comprises a block body and a pad of resilient material fitted to the block body for contact with the frame member.

Para 3. A bicycle accessory as in Para 2, in which the pad is releasably connected to the block body.

Para 4. A bicycle accessory as in Paras 2 or 3, in which the pad has a concave surface for contact with the frame member.

Para 5. A bicycle accessory as in any one of the preceding Paras, in which the receptacle has an interior stiffener of rigid material, the mounting block being secured to the stiffener.

Para 6. A bicycle accessory as in Para 5, in which the mounting block is secured to the stiffener by a fastener which extends through the material of the receptacle.

Para 7. A bicycle accessory as in Para 5 or 6, in which the stiffener comprises an elongate element provided along its length with a plurality of attachment features for attachment of the mounting block.

Para 8. A bicycle accessory as in Para 7 when appendant to Para 6, in which the attachment features are tapped holes and the fastener is a screwthreaded fastener engaging one of the tapped holes.

Para 9. A bicycle accessory as in Para 6 or 7, in which the stiffener comprises a peripheral frame, the elongate element extending across the frame.

Para 10. A bicycle accessory as in any one of Paras 5 to 9, in which the stiffener is made from a metallic material.

Para 11. A bicycle accessory as in any one of Paras 5 to 10, in which the stiffener is accommodated in a pocket situated on the inner surface of the material of the receptacle.

Para 12. A bicycle accessory as in Para 11, in which the pocket is defined between a layer of pocket material and the material of the receptacle.

Para 13. A bicycle accessory as in Para 12, in which the pocket material is sealed to the material of the receptacle around at least part of the periphery of the pocket.

Para 14. A bicycle accessory as in any one of the preceding Paras, in which the strap is made from an elastic material.

Para 15. A bicycle accessory as in Para 14, in which the strap comprises a head end and a tail end, the head end having an aperture for receiving the tail end, whereby the strap can be formed into a loop extending around the frame member in use.

Para 16. A bicycle accessory as in Para 15, in which the strap is provided with an array of openings between the head end and the tail end, and with a projection which is engageable with a selected one of the openings when the tail end is passed through the aperture to retain the strap in a required looped configuration.

Para 17. A bicycle accessory as in any one of the preceding Paras, in which the mounting block defines a strap passage for receiving the strap to retain the strap with respect to the mounting block in a releasable manner.

Para 18. A bicycle accessory as in Para 17, in which the strap passage has a depth sufficient to accommodate a double thickness of the strap.

Para 19. A bicycle accessory as in any Para 18, in which the receptacle has a recess in its external surface, the mounting block being secured to the receptacle in the recess.

Para 20. A bicycle accessory as in Para 19 when appendant to Para 5, in which the stiffener contacts the internal surface of the receptacle and has a profile corresponding to the shape of the recess.

Para 21. A bicycle accessory as in Para 20, in which the mounting block is secured to the receptacle by a fastener which extends through the stiffener and the material of the receptacle whereby the material of the receptacle is secured between the stiffener and the mounting block.

Para 22. A bicycle accessory as in Para 21, in which a clamp engages the stiffener on a surface of the stiffener away from the material of the receptacle, the clamp being secured to the mounting block by the fastener.

Para 23. A bicycle accessory as in Para 18, in which the material of the receptacle has an opening in which the mounting block is situated, the mounting block having a peripheral flange secured to the material of the receptacle around the opening, and a raised portion directed inwardly of the receptacle from the flange, the raised portion projecting into the interior of the receptacle and defining the strap passage.

Para 24. A bicycle accessory as in Para 23, in which the peripheral flange is secured to the material of the receptacle by bonding.

Para 25. A bicycle accessory as in Para 24, in which the raised portion comprises a peripheral rib surrounding the strap passage.

Para 26. A bicycle accessory as in Para 25, in which a patch is secured over the rib to seal the strap passage from the interior of the receptacle.

Para 27. A bicycle accessory as in Para 24, in which the raised portion has a cover panel which seals the strap passage from the interior of the receptacle.

Para 28. A bicycle accessory as in Para 27, in which the cover panel has an arcuate concave surface constituting an inner wall of the strap passage.

Para 29. A bicycle accessory as in Para 18 when appendant to Para 5, in which the mounting block is provided with a raised region which extends through openings in the stiffener and the material of the receptacle, the raised region being engaged by a securing feature situated within the receptacle, for securing the mounting block to the receptacle.

Para 30. A bicycle accessory as in Para 29, in which securing feature comprises a retaining clip.

Para 31. A bicycle accessory as in Para 29 or 30, in which the securing feature is provided with rails which engage parallel grooves provided in the mounting block.

Para 32. A bicycle accessory as in Para 29 or 30, in which the raised region of the mounting block defines the strap passage.

Para 33. A bicycle accessory as in any one of the preceding Paras, in which the mounting block is one of at least two spaced apart mounting blocks secured to the receptacle, each mounting block having a respective strap.

Para 34. A bicycle accessory as in Para 33, when appendant to any one of Paras 29 to 32, in which a stiffening baton extends between the spaced apart mounting blocks.

Para 35. A bicycle accessory as in Para 34, in which the baton is located with respect to the mounting blocks by the respective securing features.

Para 36. A bicycle accessory as in Para 35, in which each mounting block is provided with a recess accommodating an end region of the baton, the respective securing features engaging the baton to retain its end regions within the respective recesses.

Para 37. A bicycle accessory as in any one of the preceding Paras, in which the receptacle is in the form of a bag of flexible material.

Para 38. A kit of parts for assembly to form a bicycle accessory as in any one of Paras 5 to 13, or any one of Paras 14 to 19 when appendant to any one of Paras 5 to 13, or any one of Paras 20 to 37, the kit comprising:
  i. the receptacle,
  ii. the stiffener,
  iii. the mounting block,
  iv. the fastener, and
  v. the strap.

Para 39. A kit of parts as in Para 38 when appendant to Para 30, further comprising the retaining clip.

Para 40. A kit of parts as in Para 38 when appendant to Para 23, in which the flange of the mounting block is secured to the receptacle.

Para 41. A kit of parts as in any one of Paras 38 to 40 when appendant to Para 2, in which the kit comprises the block body and the pad as separate components.

Para 42. A kit of parts as in any one of Paras 38 to Para 41, in which a plurality of mounting blocks are provided.

Para 43. A kit of parts as in Para 42 when appendant to Para 35, further comprising the baton.

Para 44. A kit of parts as in any one of Paras 38 to 43, in which a plurality of straps of different length are provided.

Para 45. A bicycle provided with an bicycle accessory as in any one of Paras 1 to 37 or assembled from a kit as claimed in any one of Paras 38 to 44, which is mounted on a frame member of the bicycle by means of the or each strap.

We claim:

1. A frame mounted bicycle accessory comprising:
   a collapsible receptacle;
   an interior stiffener of rigid material situated within the receptacle;
   a mounting block secured to the stiffener and having a contact portion situated externally of the receptacle for contact with a frame member of a bicycle; and
   a strap provided on the mounting block and adapted to extend around the frame member to secure the accessory to the frame member;
   wherein the mounting block defines a strap passage for receiving the strap to retain the strap with respect to the mounting block in a releasable manner; and
   wherein the receptacle has a recess in its external surface, the mounting block being secured to the receptacle in the recess.

2. A bicycle accessory as claimed in claim 1, in which the mounting block comprises a block body and a pad of resilient material fitted to the block body for contact with the frame member.

3. A bicycle accessory as claimed in claim 2, in which the mounting block is secured to the stiffener by a fastener which extends through the material of the receptacle.

4. A bicycle accessory as claimed in claim 1, in which the stiffener comprises an elongate element provided along its length with a plurality of attachment features for attachment of the mounting block.

5. A bicycle accessory as claimed in claim 1, in which the strap passage has a depth sufficient to accommodate a double thickness of the strap.

6. A bicycle accessory as claimed in claim 1, in which the stiffener contacts the internal surface of the receptacle and has a profile corresponding to the shape of the recess.

7. A bicycle accessory as claimed in claim 1, in which the mounting block is secured to the receptacle by a fastener which extends through the stiffener and the material of the receptacle whereby the material of the receptacle is secured between the stiffener and the mounting block.

8. A bicycle accessory as claimed in claim 1, in which the material of the receptacle has an opening in which the mounting block is situated, the mounting block having a peripheral flange secured to the material of the receptacle around the opening, and a raised portion directed inwardly of the receptacle from the flange, the raised portion projecting into the interior of the receptacle and at least partially defining the strap passage.

9. A bicycle accessory as claimed in claim 8, in which the raised portion has a cover panel which seals the strap passage from the interior of the receptacle.

10. A bicycle accessory as claimed in claim 9, in which the cover panel has an arcuate concave surface constituting an inner wall of the strap passage.

11. A bicycle accessory as claimed in claim 1, in which the mounting block is provided with a raised region which extends through openings in the stiffener and in the material of the receptacle, the raised region being engaged by a securing feature situated within the receptacle, for securing the mounting block to the receptacle.

12. A bicycle accessory as claimed in claim 11, in which the securing feature comprises a retaining clip.

13. A bicycle accessory as claimed in claim 11, in which the securing feature is provided with rails which engage parallel grooves provided in the mounting block.

14. A bicycle accessory as claimed in claim 11, in which the raised region of the mounting block defines the strap passage.

15. A bicycle accessory as claimed in claim 1, in which the mounting block is one of at least two spaced apart mounting blocks secured to the receptacle, each mounting block having a respective strap.

16. A bicycle accessory as claimed in claim 15, in which a stiffening baton extends between the spaced apart mounting blocks.

17. A bicycle accessory as claimed in claim 16, in which the mounting block is provided with a raised region which extends through openings in the stiffener and the material of the receptacle, the raised region being engaged by a securing feature situated within the receptacle, for securing the mounting block to the receptacle, the baton being located with respect to the mounting blocks by the respective securing features.

18. A bicycle accessory as claimed in claim 17, in which each mounting block is provided with a recess accommodating an end region of the baton, the respective securing features engaging the baton to retain its end regions within the respective recesses.

19. A bicycle accessory as claimed in claim 1, in which the receptacle is in the form of a bag of flexible material.

20. A kit of parts for assembly to form a frame mounted bicycle accessory comprising:
a collapsible receptacle;
an interior stiffener of rigid material situated within the receptacle;
a mounting block secured to the stiffener and having a contact portion situated externally of the receptacle for contact with a frame member of a bicycle;
a strap provided on the mounting block and adapted to extend around the frame member to secure the accessory to the frame member,
the kit comprising:
the receptacle,
the stiffener,
the mounting block,
the fastener,
the strap, and
a retaining clip for securing the mounting block to the receptacle.

21. A frame mounted bicycle accessory comprising:
a collapsible receptacle;
an interior stiffener of rigid material situated within the receptacle;
a mounting block secured to the stiffener and having a contact portion situated externally of the receptacle for contact with a frame member of a bicycle;
a strap provided on the mounting block and adapted to extend around the frame member to secure the accessory to the frame member; wherein
the mounting block is provided with a raised region which extends through openings in the stiffener and the material of the receptacle, the raised region being engaged by a retaining clip situated within the receptacle, for securing the mounting block to the receptacle.

22. A frame mounted bicycle accessory as claimed in claim 21, wherein the mounting block is one of at least two spaced apart mounting blocks, the accessory further comprising a stiffening baton which extends between the spaced apart mounting blocks.

23. A frame mounted bicycle accessory comprising:
a collapsible receptacle;
an interior stiffener of rigid material situated within the receptacle;
a mounting block secured to the stiffener and having a contact portion situated externally of the receptacle for contact with a frame member of a bicycle; and
a strap provided on the mounting block and adapted to extend around the frame member to secure the accessory to the frame member,
wherein the mounting block defines a strap passage for receiving the strap to retain the strap with respect to the mounting block in a releasable manner, and
wherein the material of the receptacle has an opening in which the mounting block is situated, the mounting block having a peripheral flange secured to the material of the receptacle around the opening, and a raised portion directed inwardly of the receptacle from the flange, the raised portion projecting into the interior of the receptacle and at least partially defining the strap passage.

* * * * *